3,230,701
TWO STEP REACTION PROPULSION METHOD
James W. Mullen II, Richmond, Va., John B. Fenn,
Princeton, N.J., and Frank I. Tanczos, Washington,
D.C., assignors to Texaco Experiment Incorporated,
Richmond, Va., a corporation of Virginia
Filed Oct. 6, 1961, Ser. No. 144,284
14 Claims. (Cl. 60—35.4)

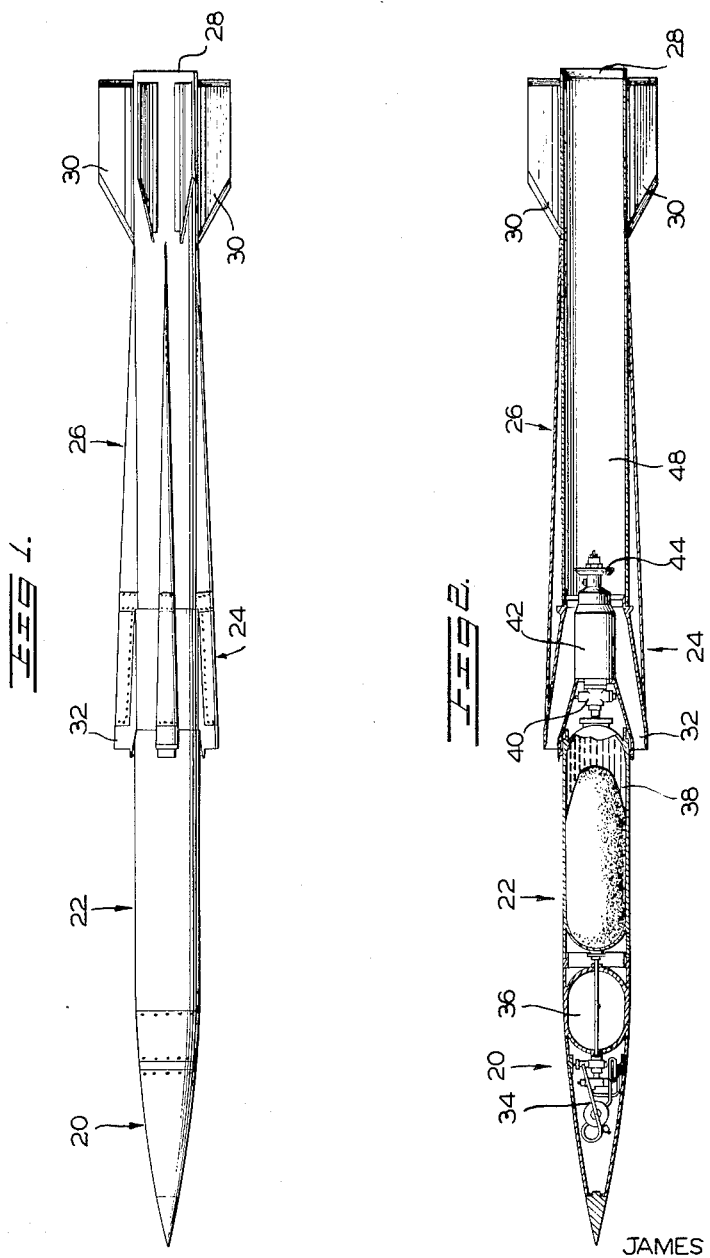

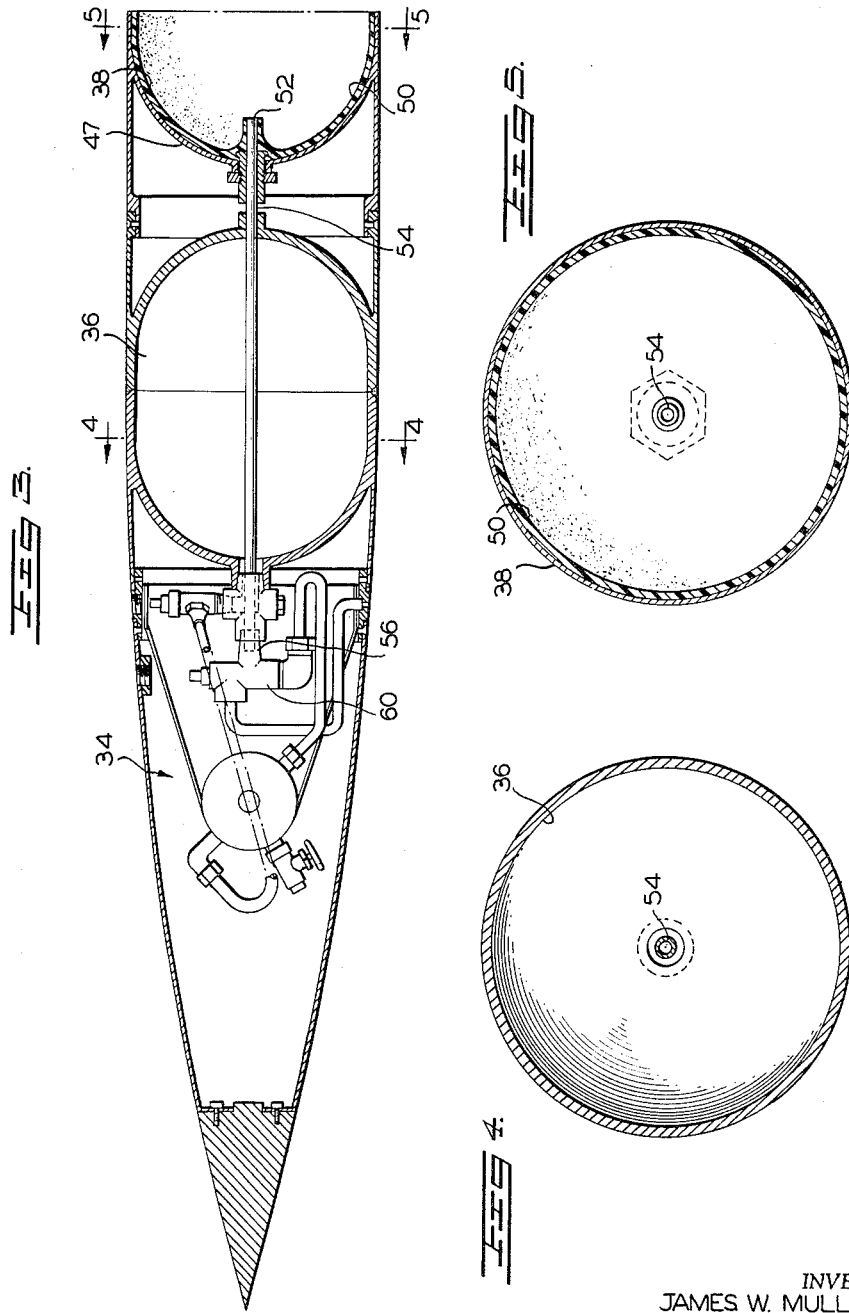

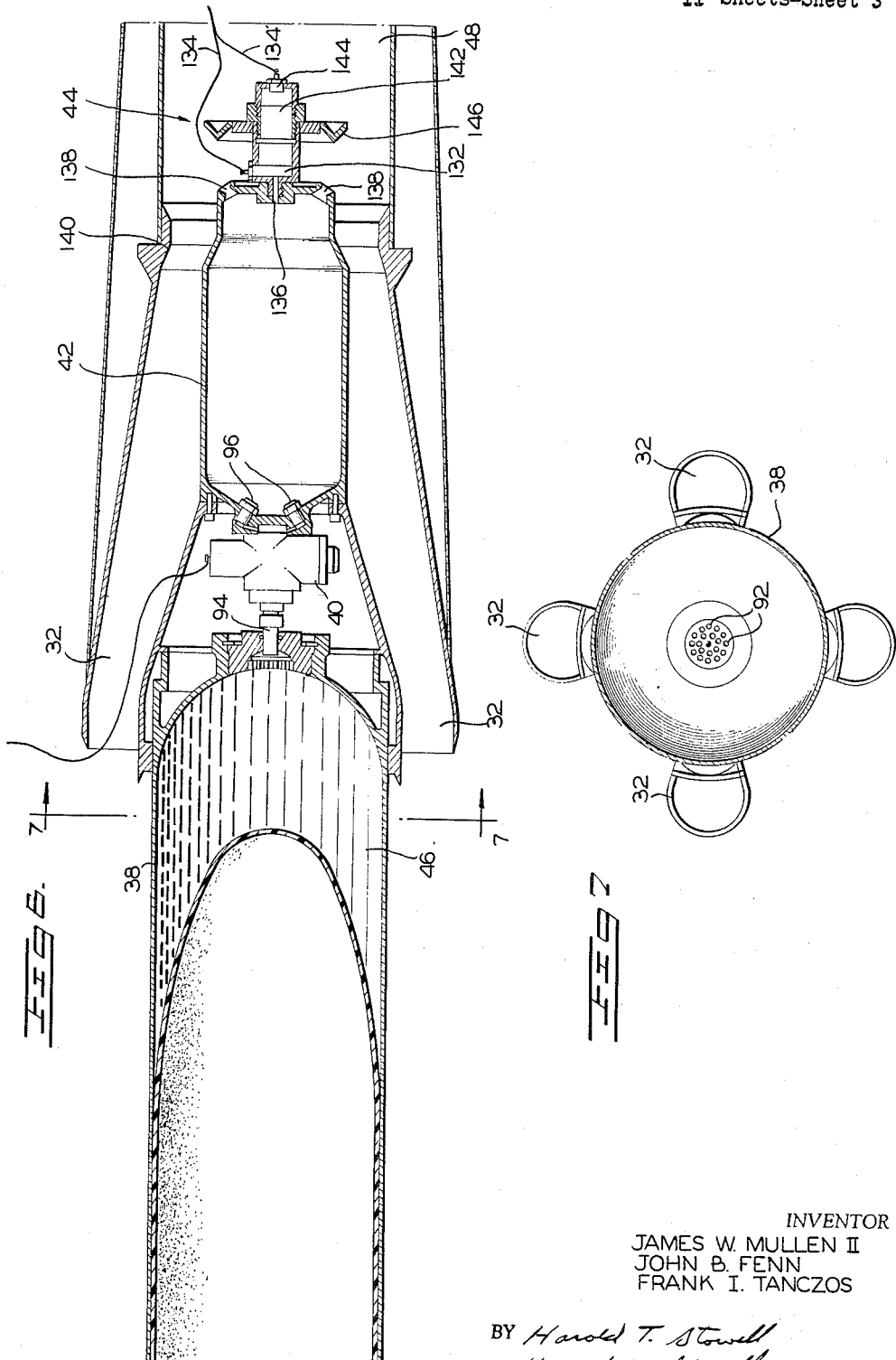

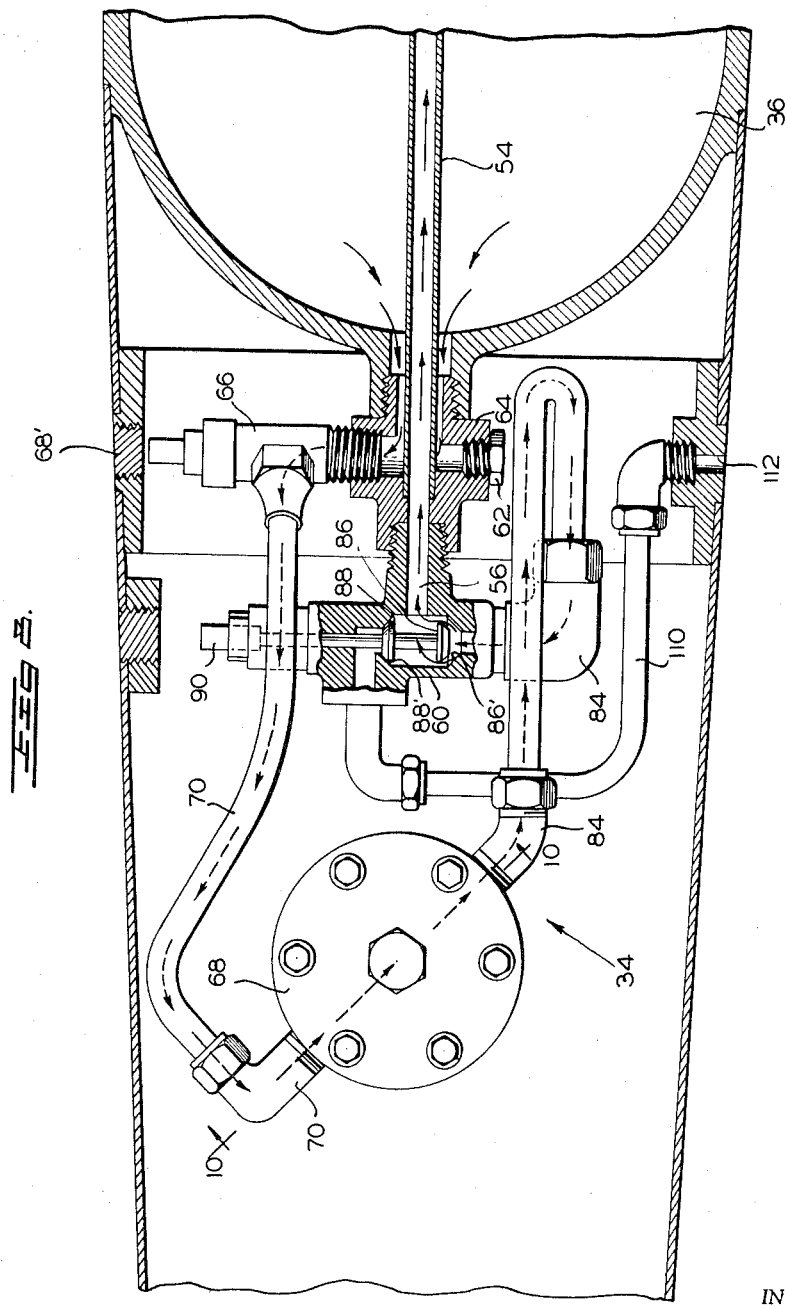
INVENTOR
JAMES W. MULLEN II
JOHN B. FENN
FRANK I. TANCZOS
BY Harold T. Stowell
Harold L. Stowell
ATTORNEYS Jan. 25, 1966   J. W. MULLEN II, ETAL   3,230,701
TWO STEP REACTION PROPULSION METHOD
Filed Oct. 6, 1961   11 Sheets-Sheet 5
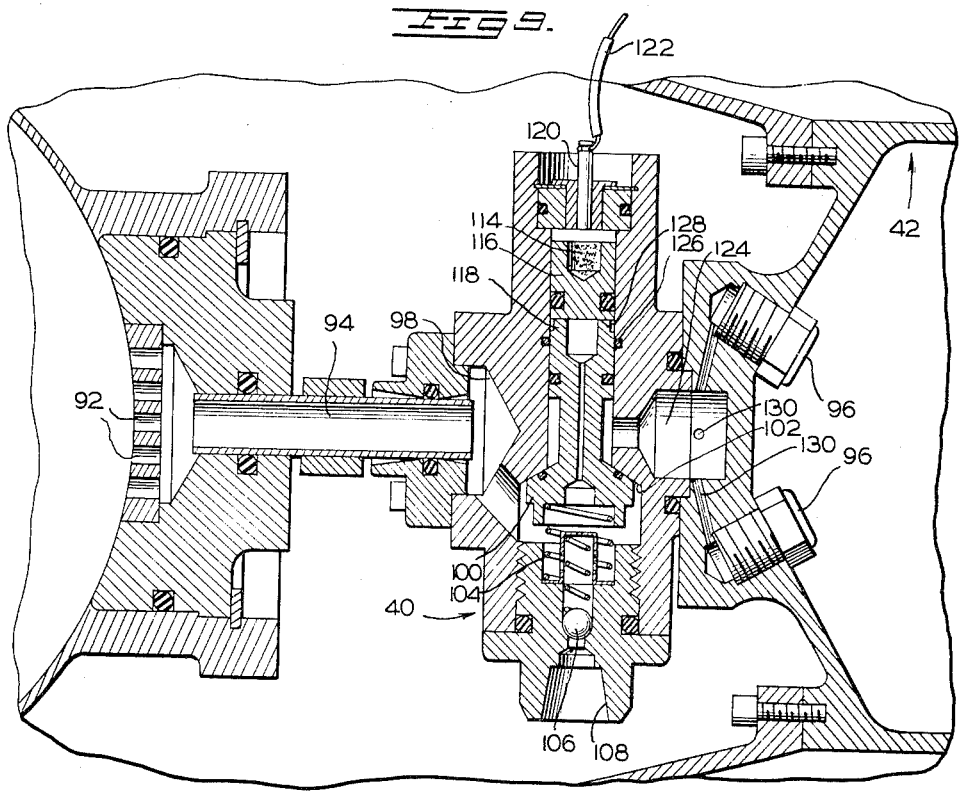
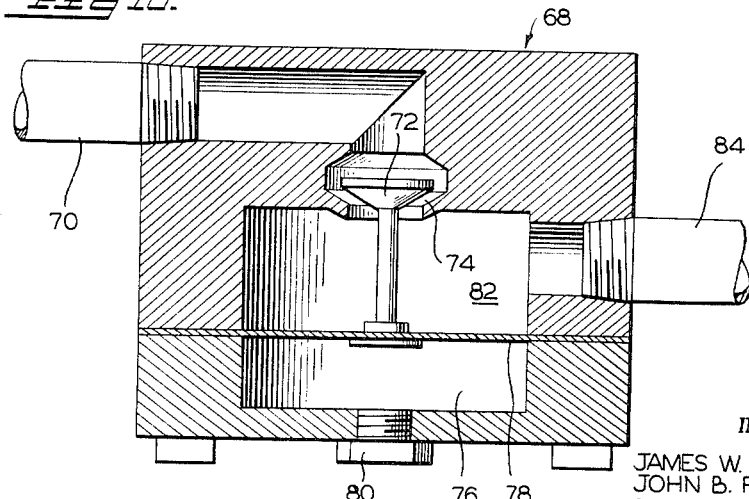
INVENTORS
JAMES W. MULLEN II
JOHN B. FENN
FRANK I. TANCZOS
BY Harold T. Stowell
Harold L. Stowell
ATTORNEYS

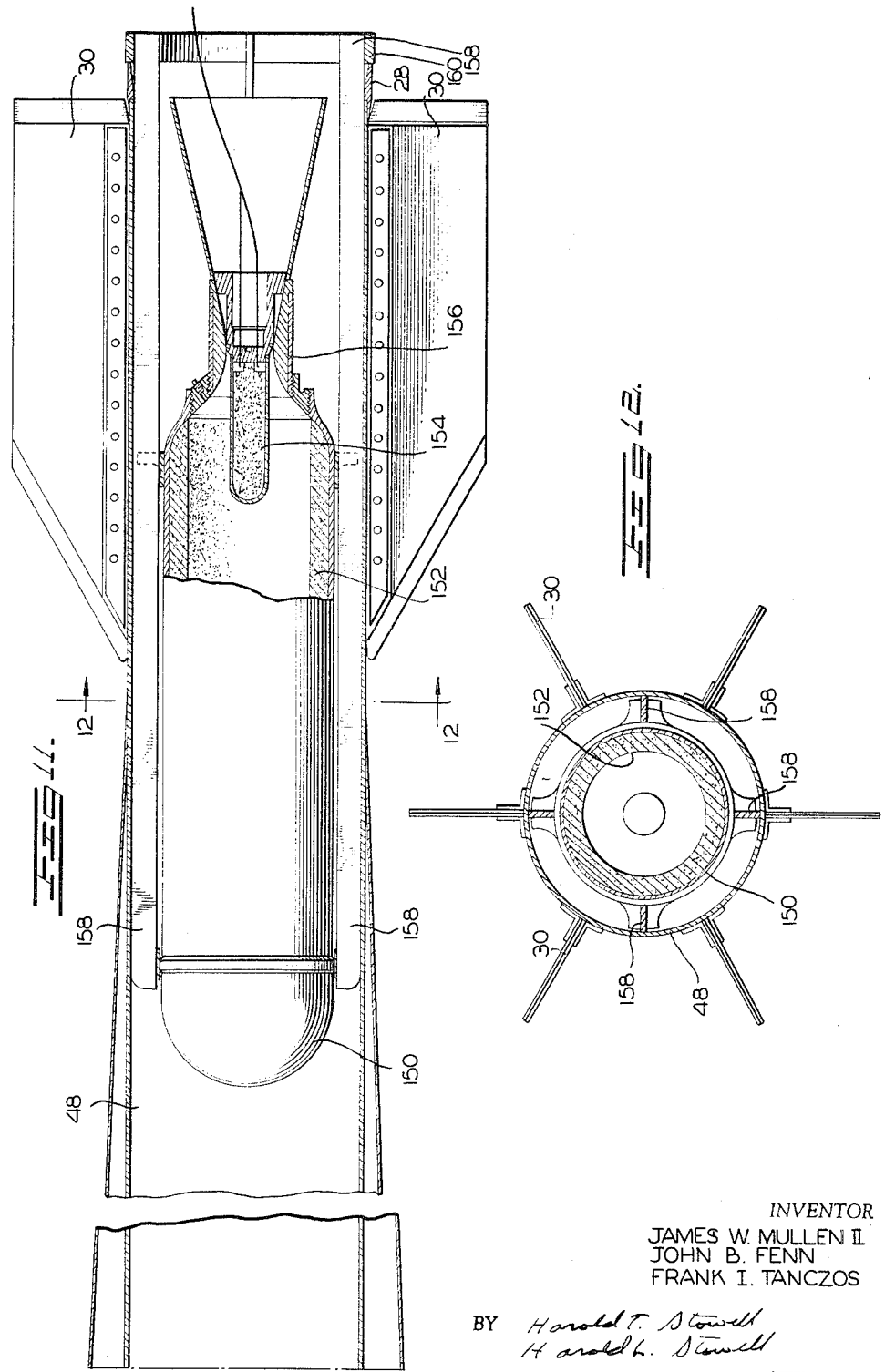

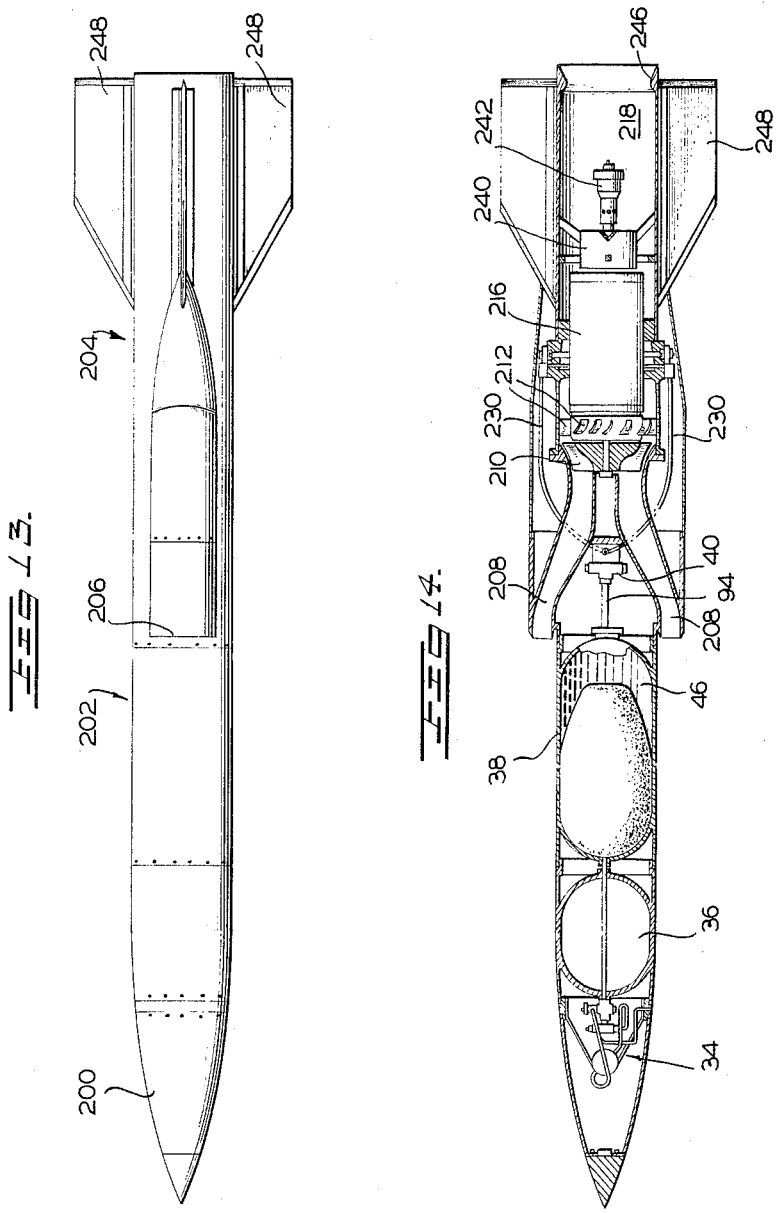

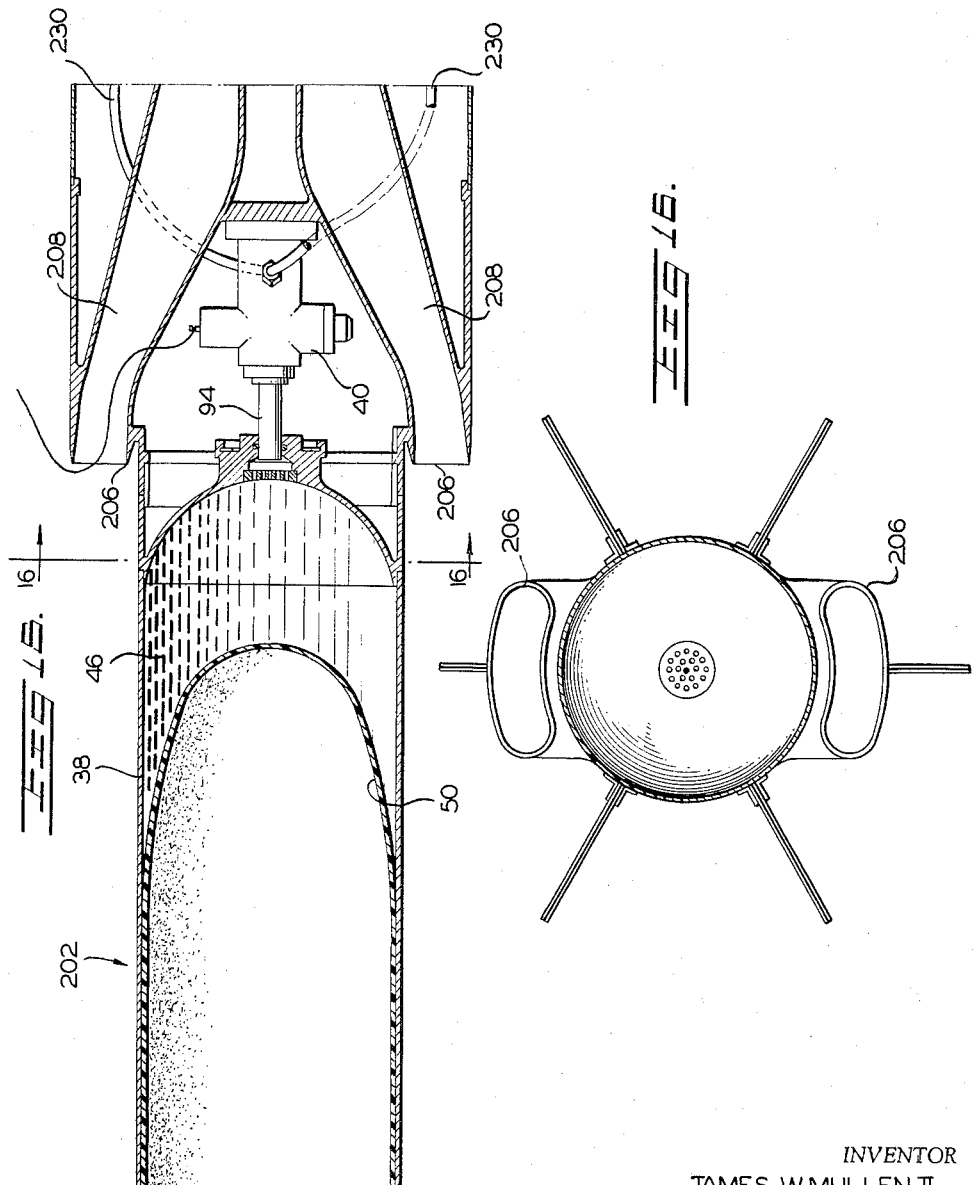

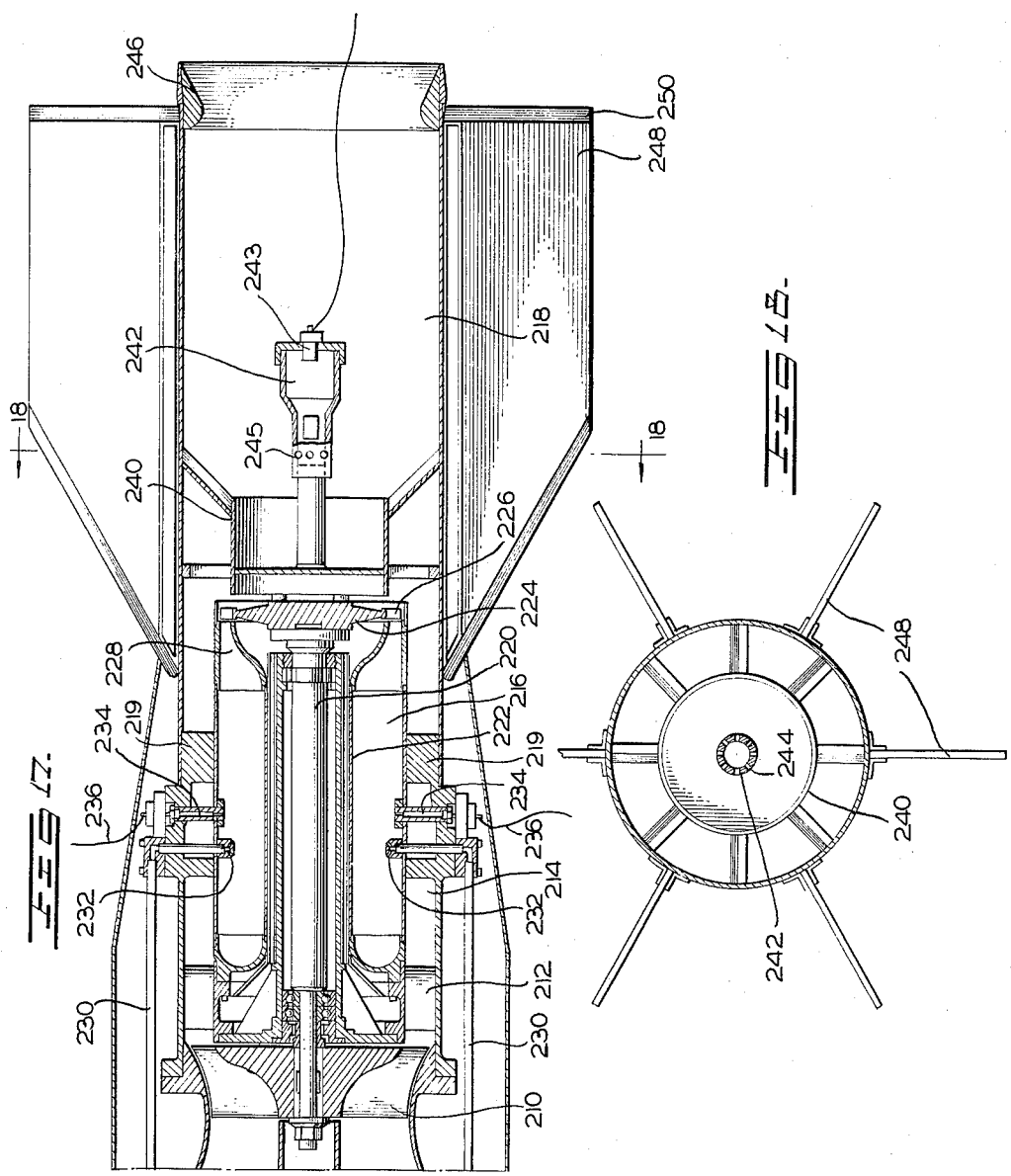

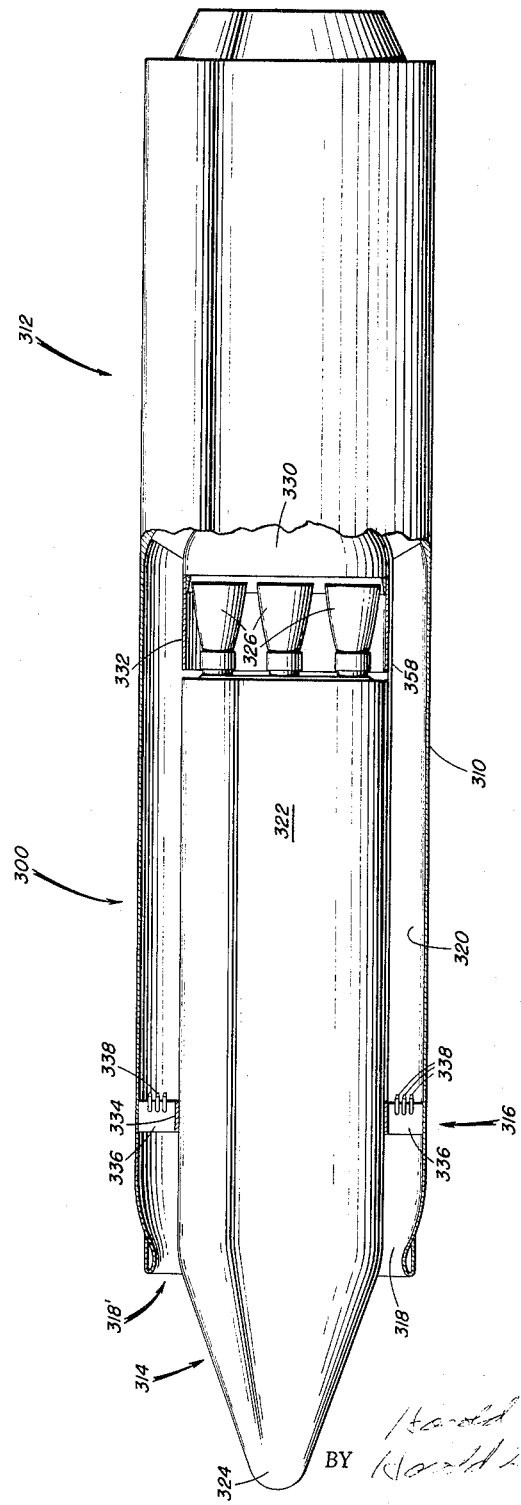

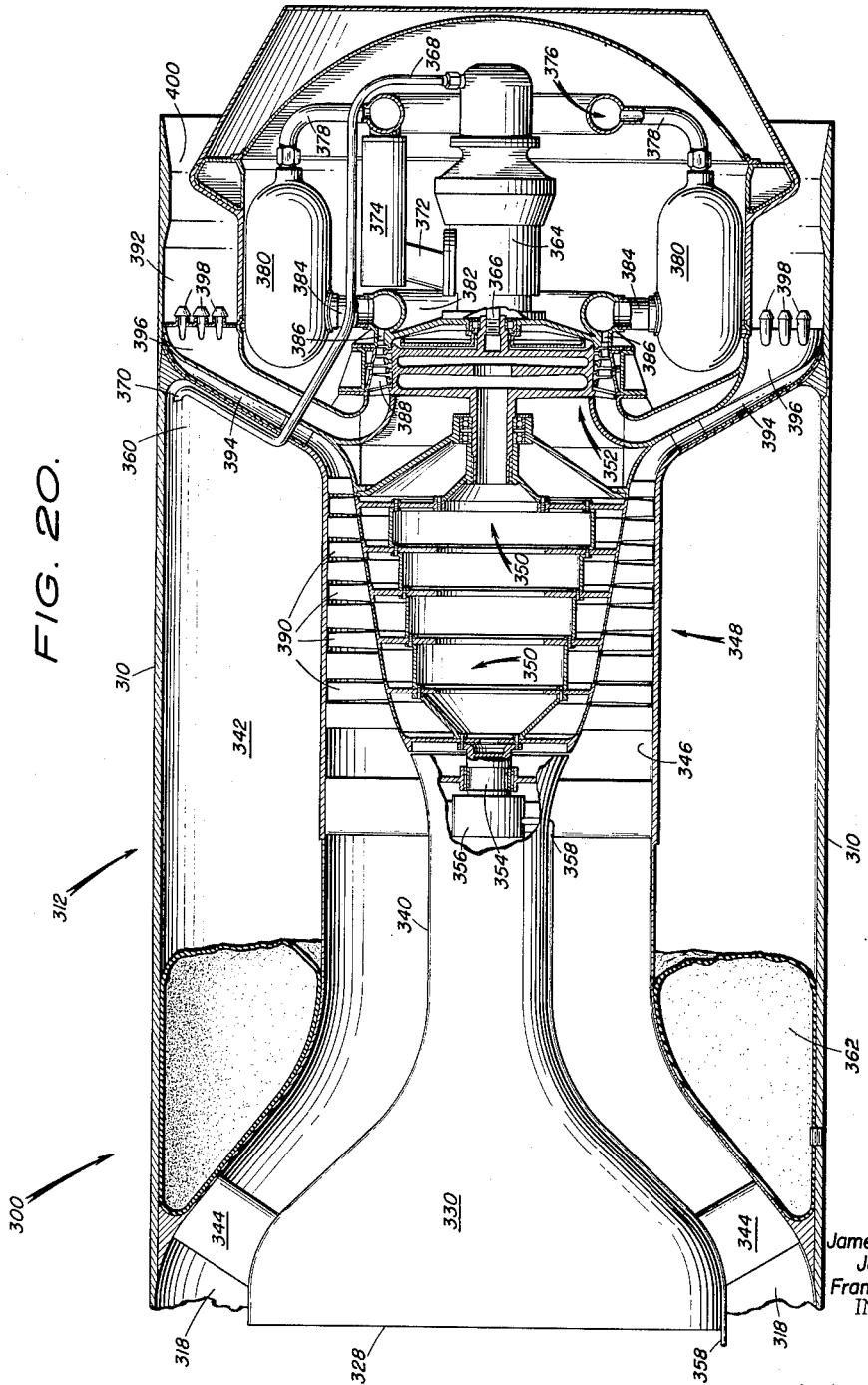

This application is a continuation-in-part of our application Serial No. 239,952, filed August 2, 1951, now abandoned, and application Serial No. 651,546, filed April 8, 1957, now forfeited, for "Method of Operating Propulsion Devices."

This invention relates to new and improved reaction propulsion engines and methods of operating them.

The invention is particularly directed to a new class of reaction propulsion devices wherein the operating cycle includes two steps, a power-producing non-combustion decomposition step followed by a combustion step wherein the products of the decomposition step are combined with oxygen to provide the final thrust-producing reaction for the device.

In one of its aspects the invention is directed to a method wherein the decomposition step of the cycle produces oxidizable decomposition products that contain substantial amounts of solid carbon particles.

In another aspect the invention is directed to a method wherein the decomposition step of the cycle produces oxidizable decomposition products that are substantially free from solid decomposition products.

A further aspect of the method of this invention lies in the provision of novel fuels which decompose with the liberation of substantial quantities of heat to provide decomposition products containing substantial amounts of solid carbon particles suspended in a hydrogen-containing gas.

It is a further object to provide a method whereby the decomposition step of the invention is utilized to provide a portion of the thrust for the operation of reaction propulsion engines by the utilization of energy released in the decomposition of the fuels as the decomposition products pass from a confined decomposition zone into a combustion chamber.

It is a further object of this invention to provide a method of operating reaction propulsion engines utilizing fuels having relatively high heats of formation, the products of decomposition of which are substantially entirely oxidizable so that heat energy may be derived both from the decomposition and from a subsequent combustion of the decomposition products thereof.

These and other objects of the present invention will be more clearly apparent to those skilled in the art when considered with the following brief description of the present invention, and the detailed description thereof with reference to the specific embodiments disclosed for the purpose of illustration of the principles of the invention.

Briefly the present invention is directed to an improved method for promoting the continuous decomposition of compounds and mixtures thereof which decompose with the release of large quantities of heat to form decomposition products which are capable of oxidation, and a method of extracting in two distinct steps the energy derived from the decomposition of the fuel and the oxidation of the decomposition products.

The fuels contemplated as within one aspect of the present invention are those which decompose with the liberation of heat into an oxidizable decomposition mixture which includes solid carbon particles.

In general, the fuels used in this aspect of the invention are acetylenic compounds and mixtures of such compounds with each other and with solvents or miscible liquids. Included in the fuels useful in the method of the invention are: acetylenic hydrocarbons, such as acetylene, propyne, including its tautomer, allene, and mixtures thereof with propyne, dimethyl acetylene, ethylacetylene and their tautomer 1,3-butadiene, vinylacetylene, 2-methylbutene-1-yne-3, 2-methyldivinyl-acetylene, diacetylene, 1,5-hexadiyne, 1,6-heptadiyne, and 1,7-octadiyne; and other acetylenic compounds, particularly the propargyl compounds such as dipropargyl ether, propargyl alcohol and the mono-, di- and tri-propargyl-amines, alone or in mixtures. Among the non-acetylenic compounds which may be admixed with the acetylenic compounds are hydrocarbons, such as, kerosene, octane, octene, benzene and other non-acetylenic hydrocarbons containing from about 6 to about 15 carbon atoms, and solvents for the acetylenic compounds, such as acetone and the like.

In general, where compounds which are subject to decomposition with the liberation of heat into combustible decomposition products which include carbon are admixed with non-acetylenic hydrocarbons to form a fuel for use in the method of the present invention from about 0% to about 20% hydrocarbons will provide very satisfactory results. However, such mixtures preferably contain not more than 15% of hydrocarbon.

Of the substantial number of compounds and admixtures which provide satisfactory utility in the method of the present invention it has been found that the following are particularly advantageous:

Propyne, including its tautomer, allene and admixtures thereof with propyne; propargyl compounds particularly dipropargyl ether, propargyl alcohol and propargylamines; and the diacetylenic hydrocarbons particularly 1,5-hexadiyne, 1,6-heptadiyne and 1,7-octadiyne.

The above listed compounds are particularly advantageous because of the large quantities of heat liberated upon decomposition and combustion, their relative stability, their potential availability in large quantities and their adaptability to the method of the present invention. Table I shows some of the chemical and physical properties of some of these preferred fuels.

TABLE I

| Fuel | Molecular weight | Adiabatic equilibrium decomposition temp., ° F. | Monopropellant specific impulse, seconds at pressure ratio 20 to 1 | Decomposition products, moles per mole of fuel | | | |
|---|---|---|---|---|---|---|---|
| | | | | C | $H_2$ | $CH_4$ | Other |
| Propyne | 40.06 | 2,529 | 190 | 2.96 | 1.92 | 0.04 | |
| Dipropargyl ether | 94.1 | 2,949 | 186.8 | 4.98 | 2.95 | 0.03 | 1.00 |
| 1,6-heptadiyne | 92.13 | 2,600 | 179.4 | 6.91 | 3.82 | 0.09 | |
| 1,7-octadiyne | 106.16 | 2,100 | 167.0 | 7.69 | 4.38 | 0.31 | |

Throughout the specification and claims the terms "decomposition mixture" means a mixture of the products of decomposition of exothermically decomposable compounds into their elements or into mixtures of elements and simple compounds, or admixtures of said decomposition products with organic compounds capable of oxidation such as non-acetylenic hydrocarbons or their thermal decomposition products.

For certain purposes, particularly when the presence of carbon particles in the engine cycle is undesirable or when high performance at relatively high fuel-air ratios is desired, fuels which decompose with the liberation of heat into oxidizable decomposition products substantially free from carbon, such as the hydrazines and ethylene oxide and mixtures containing at least about 50% of a hydrazine or ethylene oxide, are preferred.

Among the hydrazines of particular utility are unsubstituted hydrazine and lower alkyl substituted hydrazines, such as unsymmetrical dimethylhydrazine, alone or in admixture. A hydrazine fuel composition of particular utility consists essentially of about 44% of anhydrous hydrazine, about 16% of unsymmetrical dimethylhydrazine and about 40% of methylammonium nitrate. Other useful mixtures are illustrated in the following table which shows the properties of some hydrazine fuels:

Table II

| Fuel | Molecular weight | Monopropellant specific impulse, seconds at pressure ratio 20 to 1 | Heating value, B.t.u. | |
|---|---|---|---|---|
| | | | Per lb. fuel | Per lb. air |
| Hydrazine | 32.05 | 187 at 1,860° F | 8,350 | 1,940 |
| Hydrazine-UMDH (50/50) | 41.80 | 179 at 1,860° F | 11,250 | 1,670 |
| Hydrazine (75), hydrazine nitrate (25) | 38.42 | 194 at 1,860° F | 6,850 | 2,190 |

The effective utilization of the aforementioned fuels by the methods of the present invention which generally comprises operating a reaction propulsion engine by directing into a confined zone fuels which decompose with the liberation of heat into an oxidizable decomposition mixture, effecting decomposition of said fuels in said zone, directing the decomposition mixture into a combustion chamber, utilizing a portion of the energy released in said decomposition as the decomposition mixture passes and is expanded from the confined zone into the combustion chamber maintained at a lower pressure than the confined zone, and thereafter effecting rapid oxidation of said decomposition mixture in the combustion chamber, will be more particularly described as applied to illustrative reaction propulsion engines shown in the accompanying drawings in which:

FIG. 1 is a side view of a reaction propelled vehicle, herein designated as a "ram-rocket," embodying a double reaction propulsion engine adapted for carrying out the methods of the invention;

FIG. 2 is a longitudinal, sectional view through the shell of a ram-rocket shown in FIG. 1 with parts of the internal mechanisms shown in section;

FIG. 3 is an enlarged sectional view of the forward portion of the ram-rocket shown in FIG. 1;

FIG. 4 is a section substantially on line 4—4 of FIG. 3;

FIG. 5 is a section substantially on line 5—5 of FIG. 3;

FIG. 6 is an enlarged sectional view of the central portion of the ram-rocket shown in FIG. 1;

FIG. 7 is a section substantially on line 7—7 of FIG. 6;

FIG. 8 is an enlarged fragmentary view in partial section of the fuel metering system shown in FIG. 3;

FIG. 9 is an enlarged fragmentary sectional view of the fuel control valve and nozzle construction for the decomposition chamber of the ram-rocket shown in FIG. 6;

FIG. 10 is an enlarged sectional view substantially on line 10—10 of FIG. 8;

FIG. 11 is an enlarged view in partial section of a modified form of the ram-rocket shown in FIG. 1 provided with a booster rocket device in the rearward extension of the tail pipe;

FIG. 12 is a section substantially on line 12—12 of FIG. 11;

FIG. 13 is an elevational view of a turborocket constructed for carrying out the methods of the present invention;

FIG. 14 is a longitudinal section through the turborocket shown in FIG. 13;

FIG. 15 is an enlarged fragmentary sectional view of the fuel feeding and air induction portion of the turborocket shown in FIG. 14;

FIG. 16 is a section substantially on line 16—16 of FIG. 15;

FIG. 17 is an enlarged fragmentary view in partial section of the decomposition chamber and combustion chamber of the turborocket shown in FIG. 14;

FIG. 18 is a section substantially on line 18—18 of FIG. 17;

FIG. 19 is a plan view in partial section of a modified form of the invention comprising a two-stage reaction propulsion device; and FIG. 20 is an enlarged fragmentary sectional view of the air turborocket portion of the two-stage reaction propulsion device shown in FIG. 19.

Referring to FIGS. 1 through 10 and in particular FIGS. 1 and 2, there is shown a double reaction propulsion engine ("ram-rocket") embodied in a missile which generally comprises an elongated housing or shell shaped to provide a nose portion 20, a fuel pumping and storage section 22, a decomposition chamber section 24 and a combustion chamber section 26 provided with a rearwardly directed outlet 28.

The nose portion 20 of the reaction propulsion vehicle is shown in FIGS. 1 and 2, for convenience, as being small in size and enclosing the fuel metering mechanism. However, it will be appreciated that ram-rockets constructed in accordance with the principles of this invention may be provided with a nose section suitable for the particular use for which the vehicle is designed.

For example, if the device were to be employed as a missile the nose portion would house suitable high explosives and detonating devices therefor and where desired, control means for guiding the missile to a target. If the ram-rocket is to be used for obtaining meteorological data or the like at high altitudes suitable indicating, recording and/or telemetering equipment would be provided in a suitable nose section.

The rearward end of the missile is provided with stabilizing fins generally designated 30 while the center portion includes a plurality of ram air conduits 32 to be more fully described hereinafter.

Within the shell of the ram-rocket proceeding from the forward end rearwardly are housed the following structures each of which will be described in detail hereinafter. Fuel regulator 34, high pressure gas storage chamber 36, fuel storage tank 38, fuel flow initiating valve 40, fuel decomposition chamber 42, flame holder and combustion initiating flare 44 and combustion chamber and tail pipe 48.

The fuel designated 46 is stored in elongated chamber 38, the outer wall of which forms the skin of the center section 22 of the missile. In order to transfer the fuel 46 in predetermined quantities to the decomposition chamber 42 it is necessary to either pressurize the fuel by means of suitable gas pressure or pump the fuel into the decomposition chamber. Preferably, and as shown in the drawings, a pressurized gas system is employed for transferring the fuel from fuel storage tank 38 to the decomposition chamber 42. The fuel transfer system will be particularly described with reference to FIGS. 3, 4, 5, 6, 8, 9, and 10.

The fuel storage tank 38 is fitted about its forward end 47 with a resilient bladder 50. The resilient bladder 50 separates the fuel 46 from the pressurized gas inlet 52 of conduit 54, the other end of which communicates with outlet port 56 of valve 60.

Forwardly of the fuel storage chamber 38 is positioned the pressurized gas storage tank 36 which is charged with a gas such as nitrogen through outlet 62 of T-fitting 64. An manual shut-off valve 66 is maintained in the closed position during the filling of the gas storage chamber 36 to prevent the passage of gas to the gas flow regulator 68. In general, suitable operation is provided by preloading the tank 36 with nitrogen at about 3500 pounds per square inch. When the valve 66 is manually opened, access being had thereto by the removal of plug 68' in the skin of the missile, the compressed gas flows through the valve 66 to the conventional pressure regulator 68 through conduit 70.

The pressure regulator may be of the type shown in detail in FIG. 10 wherein a valve of the poppet type 72 is moved relative to its seat 74 by predetermined pressure maintained in chamber 76 acting upon diaphragm 78. An opening closed by plug 80 is provided to preload the pressure chamber 76. The compressed nitrogen flowing from nitrogen storage chamber 36 through conduit 70 into chamber 82 issues therefrom through conduit 84 at about, for example, 1250 pounds per square inch. Conduit 84 is connected to valve 60, hereinbefore described, having two valve poppets 86 and 88 controlled by a manually actuated stem 90. In operation of the device the valve poppet 86 is moved away from its seat 86' so that the gaseous pressurizing medium may flow from outlet 56 and through conduit 54 which passes through the nitrogen storage compartment 36 and into the fuel storage chamber 38 on the bladder side of the fuel 46 whereby the bladder 50 is urged toward the discharge end of the fuel chamber forcing the fuel through the plural outlets 92, more clearly shown in FIG. 9, and conduit 94 to the flow initiating valve 40, the discharge port of which connects to the plurality of fuel nozzles 96 positioned at the upstream end of the decomposition chamber 42.

Referring to FIG. 9 the flow initiating valve 40 includes an inlet opening 98 for fuel, a poppet valve 100 which in the closed position seats about the flange 102 formed in the valve body. Helical spring 104 urges the poppet valve 100 against the seat 102. At the lower end of the valve body is provided a spring urged ball check 106 which permits communication with an opening 108 for use in filling the fuel chamber 38 with fuel. During the filling of the fuel tank the spring urged ball check 106 moves away from its seated position and fuel flows through the passage 98, the conduit 94 and into the tank 38 forcing the bladder 50 towards the forward end of the chamber 38. Gas or air at the forward end of the bladder 50 is bled therefrom by manual movement of the poppet 88 of valve 60 (FIG. 8) away from its seat 88' so that the gas or air flowing out of the space ahead of the bladder passes through conduit 110 where it exhausts to atmosphere through outlet 112. Referring again to flow initiation valve 40, the poppet valve 100 is moved to the unseated position by a powder charge 114, carried in a pocket in movable piston 116 slidably connected to the upper end 118 of the poppet valve 100. An electric igniter or squib 120 for powder charge 114 is connected to an external electrical source through electrode 122. Upon excitation of the electric igniter 120 the powder charge 114 burns forcing the piston 116 and the poppet valve 100 downwardly so that fuel pressurized, as hereinbefore described, will flow from the inlet 98 of the valve past the valve seat 102 and into the plenum chamber 124. A spring type snap ring 126 moves into groove 128 when the poppet valve 100 is moved downwardly by the force of the powder charge 114 so that the valve poppet 100 is held in the open position.

Fuel entering the plenum chamber 124 passes through the plural passages 130 hence into the nozzles 96 from which it is sprayed into the decomposition chamber 42.

At the rearward end of the decomposition chamber 42 is provided a small pyrotechnic squib or electrically initiated flare 132 which is connected to an external source of electric power through electrode 134. The initiation of the electric squib or flare 132 causes the hot products of the burning flare to issue through opening 136 into the decomposition chamber 42. The hot products of combustion from the flare 132 initiate decomposition of the novel fuels of the present invention. Once decomposition is started, the pressure and temperature within the chamber 42 raise to levels at which the decomposition of freshly injected fuel is self-supporting and proceeds smoothly and continuously. Decomposition products of the fuel issue from decomposition chamber 42 through a plurality of nozzles 138 positioned peripherally about the rearward end of the decomposition chamber 42. To provide continuous decomposition of the fuel a critical pressure and temperature is maintained within the chamber preferably by maintaining at least choking conditions at the exhaust end of the decomposition chamber.

The actual shape of the exhaust opening 138 necessary to maintain at least choking conditions in chamber 42 will depend upon the characteristics of the fuel and rate of decomposition thereof and choking will occur whenever there is a restriction effective to produce a pressure ratio across the restriction of the order of 2 to 1 under the conditions of the operation. In the form of the invention shown, the nozzles 138 represent a physical restriction when compared to the size of the chamber 42.

When using propyne as the fuel the minimum pressure to sustain the decomposition thereof is about 135 pounds per square inch and the adiabetic equilibrium decomposition temperature is about 2529° F. at 300 p.s.i.a. while the adiabatic equilibrium combustion temperature at atmospheric pressure of said fuel is about 4406° F.

The shape and size of the decomposition chamber will depend upon the particular fuel employed in the ram-rocket.

With propyne, 1 pound of fuel upon decomposition gives 0.9 pound of carbon, 0.1 pound of hydrogen and about 1700 B.t.u. of heat. The high velocity and high temperature stream of hydrogen containing suspended carbon particles issuing from the nozzles 138 mixes rapidly with the ram air entering the missile through ducts 32 which has been diffused in diffusers 140 prior to its entry into the main combustion chamber 48. The diffuser 140 serves the purpose of decelerating and compressing the inlet air stream so as to permit ramjet combustion within the chamber 48.

Since the hydrogen and carbon from the decomposition of, for example, propyne, leave the rocket or decomposition chamber 42, at about 2400° F. portions of the combustible mixture formed with the surrounding air are in the autoignition region. Thus the combustion or ramjet stage of the device can be made self-piloting. However, to insure the initial piloting of the combustion stage of the operation a second flare 142 is provided at the upstream end of the combustion chamber 48, the flare being ignited by an electric squib 144 connected to electrical conduit 134'. The container for the flare 142 includes a conventional flame holder 146. The combustion products issue from the end of the tail pipe 28 to provide thrust. When propyne is the fuel for the device the 0.9 pound of carbon plus the 0.1 pound of hydrogen, from the propyne, combine with 3.2 pounds of oxygen from the ram air entering the device to form 3.3 pounds of carbon dioxide and 0.9 pound of water, liberating about 17,900 B.t.u.'s of heat.

Employing propyne as the fuel, the rocket stage of the cycle brought about by the decomposition of the fuel in decomposition chamber 42 produces an ideal specific impulse of about 190 seconds at 315 pounds per square inch absolute chamber pressure while the combustion stage of the operation produces for the stoichiometric mixture ratio an ideal air specific impulse of about 173 seconds.

Thus the ram-rocket is both a good rocket and a good ramjet.

However, since the impulses of the two stages are roughly additive, the ram-rocket combination of the invention has been found to be more advantageous in many respects to either of the prior art type engines over a wide range of flight conditions.

The ram-rocket, unlike the ramjet, can produce static thrust. In particular, the impulse and the specific thrust characteristics of an engine constructed in accordance with this invention through the high subsonic and low supersonic velocity range provide the opportunity for a considerable degree of missile self-acceleration. This in turn permits a simplification in the launching by virtue of the reduction or elimination of the booster requirement. It is further pointed out that since the rocket decomposition chamber 42 functions independently of the surroundings, it provides a pilot for the ramjet stage that is free from the deleterious effect of low pressure at high altitudes and thus provides for more suitable combustion. Thus the useful operating range of altitudes as well as air fuel ratio of the device are extended. It has also been found that the rocket contribution to the total thrust is particularly important at high altitudes where the air-breathing stage is less efficient; furthermore, jet pump action of the rocket tends to smooth out effects of air pulsation arising from instability of the diffuser feeding the combustion chamber. Both of the foregoing characteristics also make use of an aft entry diffuser, as shown in the drawings, more feasible.

The following table shows typical performance efficiencies of ram-rockets (fuel specific impulse values) employing 1.5, 3.0, 6.0, and 12.0 pounds of propyne per second per square foot of combustion chamber cross-sectional area.

[2.5:1 Diffuser]

| Mach No. | Lb. fuel/sec., sq. ft. | Sea level | 20,000 ft. | 40,000 ft. | 60,000 ft. |
| --- | --- | --- | --- | --- | --- |
| 0.8 | 1.5 | 458 | 305 | 225 | 191 |
| 0.8 | 3.0 | 307 | 235 | 197 | 180 |
| 0.8 | 6.0 | 235 | 201 | 183 | 166 |
| 0.8 | 12.0 | 200 | 184 | 170 | 157 |
| 1.2 | 1.5 | 818 | 602 | 345 | 236 |
| 1.2 | 3.0 | 623 | 379 | 256 | 202 |
| 1.2 | 6.0 | 389 | 273 | 213 | 176 |
| 1.2 | 12.0 | 276 | 219 | 184 | 160 |
| 1.6 | 1.5 | --- | 1,018 | 531 | 306 |
| 1.6 | 3.0 | 983 | 609 | 347 | 229 |
| 1.6 | 6.0 | 591 | 382 | 253 | 188 |
| 1.6 | 12.0 | 380 | 262 | 196 | 169 |
| 2.0 | 1.5 | --- | 961 | 844 | 356 |
| 2.0 | 3.0 | 796 | 858 | 430 | 237 |
| 2.0 | 6.0 | 782 | 448 | 276 | 192 |
| 2.0 | 12.0 | 415 | 279 | 203 | 168 |
| 2.4 | 1.5 | --- | 594 | 859 | 377 |
| 2.4 | 3.0 | 371 | 828 | 455 | 246 |
| 2.4 | 6.0 | 727 | 474 | 282 | 192 |
| 2.4 | 12.0 | 430 | 284 | 203 | 167 |

As indicated above, with the ram-rocket combination disclosed in FIGS. 1 through 10, it is not essential that a booster rocket be provided for the device to initiate movement of the vehicle into the air. However, where desired, a simple and relatively small booster rocket may be provided as shown in FIGS. 11 and 12. Referring to FIGS. 11 and 12, a conventional booster rocket 150 is slidably inserted into the tail end of the combustion chamber 48 of the ram-rocket. A suitable rocket fuel 152 is placed within the rocket housing 150 and an electrically ignited flare 154 is positioned within the nozzled outlet 156. The body of the booster rocket 150 is slidably mounted upon rails 158 positioned to contact the inner surface of the combustion chamber 48.

A ring 160 carried by the rails 158 engages the periphery of the tail pipe outlet 28 of the device so that upon initiation of the combustion of the rocket the thrust is carried by the ring 160 to the body of the missile through outlet ring 28.

After the vehicle has accelerated to booster separation velocity the booster rocket and its supporting rails 158 leave the combustion chamber 48 and the staged decomposition and combustion of the present invention then carry the vehicle to its destination.

The methods of the present invention may also be utilized in a turborocket type engine. FIGS. 13 through 18 show a turborocket engine which has provided very satisfactory utilization of the fuels and methods of operation of the present invention.

Referring to FIGS. 13 and 14, the turborocket generally comprises an elongated housing or shell having a nose portion 200, a body portion 202 and a tail portion 204. The nose portion and the forward part of the body portion are identical in form to the ram-rocket described with reference to FIGS. 1 through 10 and include a gas metering mechanism 34, gas storage compartment 36, fuel storage compartment 38, from which fuel designated 46, is conveyed by conduit 94 to the flow initiating valve 40.

Rearwardly of the flow initiating valve 40 this form of apparatus differs from that previously described and includes, as is more clearly shown in FIGS. 16 through 18, paired air induction scoops 206 which direct air through paired conduits 208 to the inlet side of compressor 210. The compressed air leaving compressor 210 passes diffusers 212 and then flows through an annular passage 214 the length of an annular decomposition chamber 216 into combustion chamber 218. The passage 214 is provided with a spider 219 which supports the outer wall of the decomposition chamber.

The compressor 210 is rigidly secured to shaft 220 extending the length of the decomposition chamber 216 and is separated therefrom by cylindrical wall 222 which forms the inner wall of the annular decomposition chamber.

The rearward end of shaft 220 is rigidly secured to a turbine wheel, generally designated 224, having turbine buckets or blades 226 positioned adjacent the turbine nozzles 228 located at the rearward end of the decomposition chamber 216.

The turbine 224 is actuated by the products of decomposition of the fuels of the present invention which are conducted from the flow initiating valve 40 through a plurality of conduits 230 connected to inlet nozzles 232 positioned about the outer wall of the annular decomposition chamber. In order to initiate the decomposition of the fuel ejected from spray nozzles 232 one or more electrically ignited flares or squibs 234 are positioned in the decomposition chamber. Each of the flares is connected by a conductor 236 to a suitable source of electric power for actuating the flares.

As hereinbefore described with reference to the ram-rocket vehicle, once decomposition of the fuel is initiated by the flare the temperature and pressure within the decomposition chamber is maintained above the critical value for the particular fuel so that decomposition proceeds as long as fresh fuel is injected into the chamber.

The passage of the hot products of the decomposed fuel from chamber 216 through the nozzles 228 drives the turbine through turbine buckets 226 which in turn rotates the compressor impeller 210 through shaft 220. Air compressed by compressor 210, aided by the ram effect of the inlet scoops 206, passes into the combustion chamber 218 to be mixed with the hot products of decomposition issuing from the turbine buckets 226 about the spider 240. The spider supports a further electrically actuated flare 242, having an igniter 243 and outlet orifices 245 to insure the initial combustion of the mixture of the hot products of the decomposed fuel and air compressed by compressor 210. The hot combustion gases issue from the combustion chamber through nozzle 246 to provide thrust for the vehicle. As described with reference to the forms of the invention shown in FIGS. 1 through 10 suitable fins 248, which may be provided with manually or automatically controlled surfaces 250, are provided adjacent the rearward end of the vehicle.

The following is an example of the operation of the turborocket vehicle:
Fuel flow 3.6 pounds of propyne per second;
Air flow 17.5 pounds per second;
Compressor ratio 2.5;
Diameter of burner 12 inches;
Turbine diameter 9 inches.

Opening of the fuel initiating valve 40 causes the liquid propyne to flow to the fuel injectors 232 located in the wall of the decomposition chamber 216 at the rate of 3.6 pounds per second. The decomposition of the propyne in the decomposition chamber 216 is initiated by igniters 234 located rearwardly the fuel injectors. The temperature and pressure produced by the decomposition of the propyne into carbon and hydrogen under the choking effect of the nozzles 228 maintains smooth continuous decomposition in the chamber 216. The rocket nozzles through which the decomposition products flow direct the products of decomposition against the turbine buckets 226 which may be constructed, for example, of alloys of molybdenum in view of the non-oxidizing characteristics of the decomposition products. The decomposition products enter the turbine at about 2400° F. In about 1 second after decomposition begins the turbine reaches its maximum speed of about 27,000 r.p.m. and the engine is then producing takeoff thrust. Utilizing a substantial portion of the rocket exhaust energy the single stage turbine drives the compressor 210 which delivers up to about 1325 hp. Air from the scoop inlets 206 enters the single stage compressor 210. The ratio of the outlet to inlet pressure across the compressor varies with flight speed from about 2.5 to 1.0 at takeoff to slightly more than 1.0 to 1.0 at high supersonic speeds. The compressed air leaving the compressor is ducted about the outside of the decomposition chamber 216 and the turbine 224 to the burner or combustion chamber 218. The hot carbon-hydrogen mixture leaving the turbine mixes and burns with the compressed air to generate thrust to effect propulsion of the vehicle. The swirl effect imparted by the turbine induces very rapid mixing of the carbon and hydrogen with the air stream and after ignition thereof by the igniter 242 the burning process is continuous. While an igniter is generally employed in the combustion chamber the burning process in general is self-igniting and self-maintaining.

A vehicle such as described above having a total weight of about 400 pounds would have a minimum take off acceleration of about 5 g.

While the form of the invention shown in FIGS. 13 through 19 has a pressurized bladder fuel transfer system, in many applications a rotary pump driven by the compressor shaft would be used instead of the nitrogen system particularly when operating on fuels such as propyne which has very good handling and storage characteristics. For example, it is possible to ship propyne in ordinary liquified petroleum gas bottles. Propyne being a monopropellant will, of course, explosively decompose under stimuli. These stimuli, however, must be so vigorous that there appears to be no reasonable likelihood of accidentally initiating decomposition. Tests on propyne involving gunfire and heating in closed containers have yielded satisfactory results, and, all factors considered, propyne is considered to be safer than the normal solid propellants employed in rockets.

The dual reaction characteristics of the methods of operating reaction propulsion devices of the present invention may be carried out in a simple, lightweight high-thrust engine useful for many recoverable and non-recoverable booster applications and, referring to FIGS. 19 and 20, there is shown an improved two-stage reaction propulsion vehicle 300 which includes as its first stage a turborocket engine employing the principles of the present invention and as a second stage, for example, a conventional solid fuel rocket. The two-stage reaction propelled vehicle 300 has an outer skin or housing 310 enclosing at its rearward end an air-turborocket assembly 312 which will be more fully described with reference to FIG. 20 and a separable second stage rocket 314 is enclosed within the forward portion of the vehicle.

As more clearly shown in FIG. 19, the diameter of the separable second stage rocket 314 of the two-stage vehicle is substantially less than the minimum internal diameter of the forward portion 316 of the vehicle 300 to provide a substantially unrestricted annular air passage 318 between the inner surface 320 of the skin 310 and the outer surface 322 of the second stage rocket 314.

The second stage rocket 314 includes a nose portion 324 which as in the form of the invention discussed with reference to FIGS. 1 through 10 may house the payload for the rocket. The payload and the configuration of the nose portion 324 would vary, depending upon the particular use for which the vehicle is designed. For example, if the vehicle is to be employed as a missile, the nose portion would house suitable high explosives and detonating devices therefor and, where desired, control means for guiding the missile to a target. If the vehicle is to be used for obtaining meteorological data and the like, suitable indicating, recording and/or telemetering equipment would be housed in the nose portion.

The main portion of the body of the second stage rocket 314 houses suitable fuel, oxidizer and motor means for propelling the second stage while the rearward end of the second stage is provided with one or more reaction propulsion exhaust nozzles 326. In the illustrated form of the invention four symmetrically arranged nozzles are illustrated. However, it will be appreciated that the number of nozzles and their arrangement would depend upon the choice of propulsion system for the second stage rocket which propulsion system does not comprise a portion of the present invention. While only one additional stage is illustrated as being housed within the vehicle 300, it will be appreciated by those skilled in the art that a plural stage rocket assembly may be releasably mounted therein.

Rearward of the outlet nozzles 326 is a coolant reservoir 330 to be more fully described hereinafter. Surrounding the outlet nozzles 326 is a circular wall member 332 secured to the first stage of the vehicle. The circular wall portion 332 stabilizes the second stage 314 in its "at rest" position within the vehicle 300 and aids in guiding the second stage as it separates from the nose portion 316 of the reaction propulsion vehicle. A further guide and support means for the second stage is provided by ring member 334 carried by a spider 336 secured to the inner surface 320 of the nose portion 316 and a plurality of longitudinal rails or tracks, not shown, may extend along the outer surface of the second stage 322 with the ends of the rails being supported by the circular wall 332 and the ring member 334.

The spider 336 also functions to support a plurality of nozzles 338 for directing coolant into the air stream passing through annular air passage 318. In FIG. 19 the first stage is illustrated moved slightly forward of its "at rest" position to show the line of separation of the two stages, with the circular wall 332, the top 328 of the reservoir 330 and the annular ring 334 adjacent the air inlet end 318' of the annular air passage 318 remaining with the expended first stage of the improved vehicle.

Referring particularly to FIG. 20, it is seen that the reservoir 330 generally follows the contour of the air channel 318 and therefore includes a neck portion 340 of reduced diameter. An annular fuel tank 342 is provided adjacent the rearward end of the vehicle and suitable supporting struts 344 may be provided in the annular air passage.

The rotatable blades of the compressor 348 are driven through shafting generally designated 350 by a turbine 352. A shaft 354 extends forwardly of the compressor shafting 350 and drives a conventional liquid pump 356 mounted within the reservoir 330. The coolant outlet from the pump 356 is through one or more conduits 358 which conduits extend along the outer wall of the tank 330, the circular wall 332 and the outer wall of the second stage rocket 314 of the vehicle to the hollow spider 336 whereby when the turbine is driven, coolant from the reservoir 330 may be directed into the air stream during its passage from the air inlet 318′ to the compressor 348.

Preferably, the outlet from the pump is passed through a control valve not shown whereby the coolant, which may be, for example, water or water plus an antifreeze agent, will be injected into the air stream forward of the compressor above the speed of Mach 2.5 to hold the engine air inlet temperatures below, for example, 600° F. In addition to greatly easing the engine structural design problem, the coolant injection also increases the engine air flow capacity, thereby permitting efficient matching with the air inlet without requiring variable inlet control mechanisms. Further, the high Mach number thrusts are considerably increased by the coolant addition at some cost in overall propellant impulse. In general, the coolant injection rates would be from about 10% to about 25% of airflow at Mach 5.

Fuel maintained in tank 342 is of the exothermic decomposable type and is urged toward the sump end 360 of the tank by a pressure bladder system 362. The pressure bladder 362 is not employed as the primary means for transferring the fuel from fuel tank 342 to the engine as this is accomplished by a fuel pump 364 driven by a shaft 366 connected to the opposite end of the turbine 352 from shafting 350 which, as hereinabove described, drives the air compressor 348. The pump 364 is connected to the sump end 360 of the fuel tank 342 by one or more fuel conduits 368 having an open end 370 within the tank 360. The output from the fuel pump 364 is directed by a conduit 372 to an automatic fuel metering or regulating device 374 of conventional design which forms no specific part of the present invention.

The fuel from the fuel metering and regulating device 374 enters an annulus 376 which annulus is provided with a plurality of fuel offtake pipes 378, each of which is connected to the rearward end of its decomposition chamber 380. In the illustrated form of the invention, two decomposition chambers are illustrated; however, it will be appreciated that a plurality of such chambers may be connected to the annulus 376. The fuel entering the decomposition chambers 380 decomposes and the products of decomposition of the fuels of the invention are conducted from the forward ends of each of the decomposition chambers to a turbine nozzle ring 382 by conduits 384. The turbine nozzle ring communicates through turbine nozzles 386 with the turbine buckets or blades 388.

In order to initiate the decomposition of the fuel in the decomposition chambers 380, suitable electrically ignited flares or squibs may be positioned in the decomposition chamber as hereinbefore discussed with reference to the form of the invention shown in FIG. 14. The flares in the decomposition chambers 380 build up pressure in the decomposition chambers, thereby driving the turbine which, in turn, rapidly accelerates to provide decomposable fuel for the decomposition chambers. Once decomposition of the fuel is initiated by the flares, the temperature and pressure within the decomposition chambers 380 is maintained above the critical value for the particular fuel so that decomposition proceeds as long as fresh fuel is directed into the decomposition chambers.

The passage of the hot decomposition products of the fuel from the decomposition chambers 380 through the nozzles 386 drives the turbine through the turbine blades 388 which, in turn, rotates the compressor rotor blades 390 through the shafting 350. In addition, the turbine drives the pump 364 for the fuel and for supplying coolant from the tank 330 to the air stream prior to entering the compressor 348. Air, compressed by the compressor 348 aided by the ram effect of the inlet 318, passes into the annular combustion chamber 392 via ducts 394 and mixes with the hot products of decomposition issuing from the turbine buckets 388 via the spiders 396 provided with outlet orifices 398. In the upper portion of the engine illustrated in FIG. 20, the decomposition products spider 396 is shown in section while the section of the spider illustrated in the lower portion of the drawing is shown in full lines. The spider 396 may support a further electrically actuated flare to insure the initial combustion of the mixture of the hot products of decomposition of decomposed fuel and air compressed by the compressor 348. The hot combustion gases issue from the combustion chamber through the annular nozzle 400 to provide thrust for the vehicle.

The air turborocket engine carries the vehicle 300 to a predetermined altitude and velocity condition where separation of the first and second stages take place. With the second stage carried inside the air inlet of the first stage, the high internal pressure acting behind the rearward end of the first stage provides an effective separating force at substantially all supersonic speeds. A high separation velocity may thus be provided and instantaneous separation is possible while the air turborocket is operating at full power. As soon as the second stage separates, the air turborocket engine performance is materially degraded to the extent that the first stage will begin to decelerate very rapidly. Even with a coast period after the upper stage ignition, the first stage would not overtake the second stage; therefore, no air turborocket engine shutdown is necessary prior to separation of the stages.

From the foregoing description of the invention and hicle 300, it will be seen that the rocket exhaust products become the fuel for the air combustion stage of the cycle and that substantially full compressor discharge pressure is available at the exhaust nozzles for generating thrust as opposed to turbojets which have a large pressure drop through the turbine, thus permitting engine pressure ratios and thrust levels well above those possible in conventional turbojet cycles while retaining a relative simple rotating assembly with few compressor and turbine stages. The simple combination of rocket and air breathing engine components clearly provides a simple, lightweight, high thrust assembly; major requirements for a recoverable or nonrecoverable rocket application.

The hydrazine fuels and fuel mixtures hereinbefore discussed provide particularly suitable fuels for the first stage of the two-stage reaction propulsion vehicles of FIGS. 19 and 20 when operating as a booster engine at high fuel-air ratios which for acetylenic fuels would amount to fuel-rich operation. Under this condition, the heating value which is significant is based on the mass of air rather than the mass of fuel. On this basis hydrazine and its derivatives have heating values per pound of air some 20% to 30% greater than the acetylenics while retaining at least as good rocket impulse values.

From the foregoing discussion of the plural stage vethe means for carrying out the invention it will be seen that revolutionary new processes for the operation of reaction propulsion engines have been provided whereby light weight ramrockets and turborocket engines may be effectively operated over a wide range of operating conditions fully satisfying the aims, objects and advantages of the invention.

We claim:

1. A method of operating a reaction propulsion engine which comprises directing a fuel subject to exothermic thermal decomposition with the formation of oxidizable decomposition products into a confined zone, continuously maintaining said confined zone at conditions of temperature and pressure effective to cause the fuel to decompose exothermically, permitting the products of decomposition to flow at least at sonic speed from the confined zone while continuing to maintain said conditions of temperature and pressure in the confined zone, directing the products of decomposition flowing from the confined zone into a combustion chamber, converting to useful work a portion of the energy released in said decomposition in passing from the confined zone into the combustion chamber, and thereafter causing the rapid oxidation of said decomposition products in the combustion chamber.

2. A method of operating a reaction propulsion engine as defined in claim 1 wherein energy released in said decomposition is converted to useful work in compressing air for the oxidation of the decomposition products.

3. A method of operating a reaction propulsion engine which comprises directing acetylenic fuels selected from the group consisting of acetylenic hydrocarbons and tautomers thereof, dipropargyl ether, propargyl alcohol and mono-, di- and tri-propargylamine subject to exothermic thermal decomposition with the formation of solid carbon particles and gaseous decomposition products capable of oxidation into a confined zone maintained at conditions of temperature and pressure effective to cause the fuels to decompose exothermically, permitting the products of decomposition to flow at least at sonic speed from the confined zone while continuing to maintain said conditions of temperature and pressure in the confined zone, directing the products of decomposition into a combustion chamber, utilizing a portion of the energy released in said decomposition in passing from the confined zone into the combustion chamber, and thereafter causing the rapid oxidation of said decomposition products in the combustion chamber.

4. A method of operating a reaction propulsion engine which comprises directing fuels consisting of a mixture of acetylenic compounds selected from the group consisting of acetylenic hydrocarbons and tautomers thereof, dipropargyl ether, propargyl alcohol and mono-, di- and tri-propargylamine and organic compounds selected from the group consisting of non-acetylenic hydrocarbons containing from about 6 to about 15 carbon atoms and acetone subject to exothermic thermal decomposition with the formation of solid carbon particles and gaseous decomposition products capable of oxidation, said mixture containing at least 80% of acetylenic compounds, into a confined zone maintained at conditions of temperature and pressure effective to cause the fuels to decompose exothermically, permitting the products of decomposition to flow at least at sonic speed from the confined zone while continuing to maintain said conditions of temperature and pressure in the confined zone, directing the products of decomposition into a combustion chamber, utilizing a portion of the energy released in said decomposition in passing from the confined zone into the combustion chamber, and thereafter causing the rapid oxidation of said decomposition products in the combustion chamber.

5. A method of operating a reaction propulsion engine which comprises directing fuels comprising at least 80% of acetylenic compounds selected from the group consisting of acetylenic hydrocarbons and tautomers thereof, dipropargyl ether, propargyl alcohol and mono-, di- and tri-propargylamine subject to exothermic thermal decomposition with the formation of solid carbon particles and gaseous decomposition products capable of oxidation into a confined zone maintained at conditions of temperature and pressure effective to cause the fuels to decompose exothermically, permitting the products of decomposition to flow at least at sonic speed from the confined zone while continuing to maintain said conditions of temperature and pressure in the confined zone, directing the products of decomposition into a combustion chamber, utilizing a portion of the energy released in said decomposition in passing from the confined zone into the combustion chamber, and thereafter causing the rapid oxidation of said decomposition products in the combustion chamber.

6. A method of operating a reaction propulsion engine which comprises directing acetylenic hydrocarbons subject to exothermic thermal decomposition with the formation of solid carbon particles and gaseous decomposition products capable of oxidation into a confined zone maintained at conditions of temperature and pressure effective to cause the fuels to decompose exothermically, permitting the products of decomposition to flow at least at sonic speed from the confined zone while continuing to maintain said conditions of temperature and pressure in the confined zone, directing the products of decomposition into a combustion chamber, utilizing a portion of the energy released in said decomposition in passing from the confined zone into the combustion chamber, and thereafter causing the rapid oxidation of said decomposition products in the combustion chamber.

7. A method of operating a reaction propulsion engine which comprises directing propyne into a confined zone maintained at conditions of temperature and pressure effective to cause the propyne to decompose exothermically with the formation of solid carbon particles and gaseous decomposition products capable of oxidation, permitting the products of decomposition to flow at least at sonic speed from the confined zone while continuing to maintain said conditions of temperature and pressure in the confined zone, directing the products of decomposition into a combustion chamber, utilizing a portion of the energy released in said decomposition in passing from the confined zone into the combustion chamber, and thereafter causing the rapid oxidation of said decomposition products in the combustion chamber.

8. A method of operating a reaction propulsion engine which comprises directing dipropargyl ether subject to exothermic thermal decomposition with the formation of solid carbon particles and gaseous decomposition products capable of oxidation into a confined zone maintained at conditions of temperature and pressure effective to cause the fuels to decompose exothermically, permitting the products of decomposition to flow at least at sonic speed from the confined zone while continuing to maintain said conditions of temperature and pressure in the confined zone, directing the products of decomposition into a combustion chamber, utilizing a portion of the energy released in said decomposition in passing from the confined zone into the combustion chamber, and thereafter causing the rapid oxidation of said decomposition products in the combustion chamber.

9. A method of operating a reaction propulsion engine which comprises directing diacetylenic hydrocarbons subject to exothermic thermal decomposition with the formation of solid carbon particles and gaseous decomposition products capable of oxidation into a confined zone maintained at conditions of temperature and pressure effective to cause the fuels to decompose exothermically, permitting the products of decomposition to flow at least at sonic speeds from the confined zone while continuing to maintain said conditions of temperature and pressure in the confined zone, directing the products of decomposition into a combustion chamber, utilizing a portion of the energy released in said decomposition in passing from the confined zone into the combustion chamber, and thereafter causing the rapid oxidation of said decomposition products in the combustion chamber.

10. A method of operating a reaction propulsion engine which comprises directing a fuel subject to exothermic thermal decomposition with the formation of oxidizable gaseous decomposition products substantially free from solid decomposition products into a confined zone, continuously maintaining said confined zone at conditions of temperature and pressure effective to cause the fuel to decompose exothermically, permitting the products of decomposition to flow at least at sonic speed from the confined zone while continuing to maintain said conditions of temperature and pressure in the confined zone, directing the products of decomposition flowing from the confined zone into a combustion chamber, converting to useful work a portion of the energy released in said decomposition in passing from the confined zone into the combustion chamber, and thereafter causing the rapid oxidation of said decomposition products in the combustion chamber.

11. A method of operating a reaction propulsion engine which comprises directing a hydrazine fuel subject to exothermic thermal decomposition with the formation of oxidizable gaseous decomposition products substantially free from solid decomposition products into a confined zone, continuously maintaining said confined zone at conditions of temperature and pressure effective to cause the fuel to decompose exothermically, permitting the products of decomposition to flow at least at sonic speed from the confined zone while continuing to maintain said conditions of temperature and pressure in the confined zone, directing the products of decomposition flowing from the confined zone into a combustion chamber, converting to useful work a portion of the energy released in said decomposition in passing from the confined zone into the combustion chamber, and thereafter causing the rapid oxidation of said decomposition products in the combustion chamber.

12. A method of operating a reaction propulsion engine which comprises directing a fuel containing at least 50% of a hydrazine selected from the group consisting of hydrazine and lower alkyl hydrazines and mixtures thereof subject to exothermic thermal decomposition with the formation of oxidizable gaseous decomposition products substantially free from solid decomposition products into a confined zone, continuously maintaining said confined zone at conditions of temperature and pressure effective to cause the fuel to decompose exothermically, permitting the products of decomposition to flow at least at sonic speed from the confined zone while continuing to maintain said conditions of temperature and pressure in the confined zone, directing the products of decomposition flowing from the confined zone into a combustion chamber, converting to useful work a portion of the energy released in said decomposition in passing from the confined zone into the combustion chamber, and thereafter causing the rapid oxidation of said decomposition products in the combustion chamber.

13. A method of operating a reaction propulsion engine which comprises directing a fuel containing at least 50% of hydrazine subject to exothermic thermal decomposition with the formation of oxidizable gaseous decomposition products substantially free from solid decomposition products into a confined zone, continuously maintaining said confined zone at conditions of temperature and pressure effective to cause the fuel to decompose exothermically, permitting the products of decomposition to flow at least at sonic speed from the confined zone while continuing to maintain said conditions of temperature and pressure in the confined zone, directing the products of decomposition flowing from the confined zone into a combustion chamber, converting to useful work a portion of the energy released in said decomposition in passing from the confined zone into the combustion chamber, and thereafter causing the rapid oxidation of said decomposition products in the combustion chamber.

14. A method of operating a reaction propulsion engine which comprises directing a fuel containing at least 50% of a mixture of hydrazine and unsymmetrical dimethylhydrazine subject to exothermic thermal decomposition with the formation of oxidizable gaseous decomposition products substantially free from solid decomposition products into a confined zone, continuously maintaining said confined zone at conditions of temperature and pressure effective to cause the fuel to decompose exothermically, permitting the products of decomposition to flow at least at sonic speed from the confined zone while continuing to maintain said conditions of temperature and pressure in the confined zone, directing the products of decomposition flowing from the confined zone into a combustion chamber, converting to useful work a portion of the energy released in said decomposition in passing from the confined zone into the combustion chamber, and thereafter causing the rapid oxidation of said decomposition products in the combustion chamber.

References Cited by the Examiner

UNITED STATES PATENTS

| | | | |
|---|---|---|---|
| 2,648,317 | 8/1953 | Mikulasek et al. | |
| 2,735,263 | 2/1956 | Charshafian | 60—35.6 |
| 2,883,828 | 4/1959 | Howell | 60—35.6 |
| 2,996,877 | 8/1961 | McMillan et al. | 60—35.4 |
| 3,002,340 | 10/1961 | Landerman | 60—35.6 |
| 3,010,279 | 11/1961 | Mullen et al. | 60—35.4 |

CARL D. QUARFORTH, *Primary Examiner.*

LEON D. ROSDOL, *Examiner.*